(12) United States Patent
Ohlsson

(10) Patent No.: US 6,921,097 B2
(45) Date of Patent: Jul. 26, 2005

(54) ARRANGEMENT FOR WHEEL SUSPENSION (75) Inventor: Karl-Erik Ohlsson, Vaxjo (SE)

(73) Assignee: Volvo Articulated Haulers AB, Växjö (SE)

( * ) Notice: Subject to any disclaimer, the term of this patent is extended or adjusted under 35 U.S.C. 154(b) by 0 days.

(21) Appl. No.: 10/248,800

(22) Filed: Feb. 19, 2003

(65) Prior Publication Data
US 2003/0102645 A1 Jun. 5, 2003

Related U.S. Application Data (63) Continuation of application No. PCT/SE01/01653, filed on Jul. 24, 2001.

(51) Int. Cl.$^7$ ............................................. B60G 5/04
(52) U.S. Cl. ................. 280/124.109; 280/124.116; 280/124.166; 280/682; 280/678
(58) Field of Search ................ 280/124.109, 124.116, 280/682, 681, 676, 124.166

(56) References Cited

U.S. PATENT DOCUMENTS

| | | | | |
|---|---|---|---|---|
| 3,687,477 | A | * 8/1972 | Miller | 280/681 |
| 3,713,665 | A | * 1/1973 | Gouirand | 280/6.157 |
| 4,061,361 | A | * 12/1977 | Felburn | 280/681 |
| 4,256,327 | A | * 3/1981 | Leinweber | 280/684 |
| 4,494,771 | A | * 1/1985 | Raidel | 280/711 |
| 4,722,549 | A | * 2/1988 | Raidel | 280/86.75 |
| 5,033,769 | A | * 7/1991 | Raidel | 280/676 |
| 5,083,812 | A | * 1/1992 | Wallace et al. | 280/124.106 |
| 5,230,528 | A | * 7/1993 | Van Raden et al. | 280/86.5 |
| 5,447,324 | A | * 9/1995 | Raidel, Sr. | 280/676 |
| 5,816,605 | A | * 10/1998 | Raidel, Sr. | 280/676 |
| 5,820,156 | A | * 10/1998 | VanDenberg | 280/676 |
| 5,951,032 | A | * 9/1999 | Overby et al. | 280/124.116 |
| 6,460,872 | B2 | * 10/2002 | Cadden | 280/678 |

FOREIGN PATENT DOCUMENTS

WO    WO 99/56995    * 11/1999

* cited by examiner

Primary Examiner—Paul N. Dickson
Assistant Examiner—George D. Spisich
(74) Attorney, Agent, or Firm—Novak, Druce & Quigg, LLP (57) ABSTRACT Arrangement for wheel suspension in a vehicle (1) including a vehicle frame (9) that bears at least two bogie axles (16, 17) which in turn each bear a wheel axle (5, 6), and also a first bogie element (18) and a second bogie element (19) which extend essentially in the longitudinal direction of the vehicle and are suspended in said vehicle frame (9). The invention includes at least one connection element (25; 41) extending essentially transversely to the longitudinal direction of the vehicle (1), which connection element (25; 41) is connected movably to at least one of the bogie axles (16; 17) and also to the bogie elements (18, 19), for transmission of a force which arises when relative movement takes place between the bogie axle (16; 17) concerned and said bogie elements (18, 19). By virtue of the invention, good comfort and a high degree of roll rigidity of the vehicle are obtained.

16 Claims, 6 Drawing Sheets

ARRANGEMENT FOR WHEEL SUSPENSION

CROSS REFERENCE TO RELATED APPLICATIONS

This application is a continuation patent application of International Application No. PCT/SE01/01653 filed 24 Jul. 2001 which was published in English pursuant to Article 21(2) of the Patent Cooperation Treaty, and which claims priority to Swedish Application No. 0002965-2, filed 18 Aug. 2000. Both applications are expressly incorporated herein by reference in their entireties.

BACKGROUND OF INVENTION

1. Technical Field

The present invention relates to an arrangement for wheel suspension in a vehicle including a vehicle frame that bears at least two bogie axles that in turn each bear a wheel axle. There is also a first bogie element and a second bogie element that extend essentially in the longitudinal direction of the vehicle and are suspended in the vehicle frame.

2. Background Art

In connection with transporting heavy loads, for example in construction work, use is often made of vehicles of the frame-steered dumper type. Such vehicles can be driven with large and heavy loads in areas where there are no roads, which may be the case in, for example, transport operations connected with road and tunnel construction, sand pits, mines and similar environments.

Conventional frame-steered dumpers of this type usually include of a front vehicle part known as an engine unit, and which includes a front frame that bears an engine and a front wheel axle. The dumper also has a rear vehicle part in the form of a load unit with a rear frame that bears a front bogie axle and a rear bogie axle upon which the respective wheel axles are borne. The vehicle is normally adapted so as to be changed over for operation with different wheel combinations, in which connection it is possible for all six wheels on the three axles to be driven depending on the current operating conditions. A frame-steered dumper can weigh on the order of 15–30 tons and can be loaded with weight on the order of 20–35 tons.

In a frame-steered dumper, the frame of the engine unit is coupled together with the frame of the load unit via a special steering coupling that allows the engine unit and the load unit to be rotated in relation to one another about an imaginary longitudinal axis; that is to say, an axis extending in the longitudinal direction of the vehicle. This steering coupling also provides a vertical bearing for steering the vehicle. In this way, the engine unit and the load unit are allowed to move essentially independently of one another. This reduces the stresses that act on the vehicle, particularly when driving on difficult terrain.

A frame-steered dumper is normally equipped with a diesel engine and an automatic gearbox with, for example, six forward gears and two reverse gears. For braking the vehicle, use is made of a service brake that is suitably of the hydraulic type, and which is divided into two brake circuits, a first brake circuit being intended for the engine unit and a second brake circuit being intended for the load unit. As mentioned above, the dumper also includes three wheel axles and a bogie arrangement for suspension of the two bogie axles of the load unit. In this connection, the purpose of the bogie arrangement is to provide a suitable springing function for the dumper, with good comfort for the driver of the vehicle and damping of excessive swaying movements. The latter requirement is especially important for safety reasons when driving with a loaded vehicle.

Use is normally made of a bogie construction in the load unit that has two bogie elements in the form of bogie beams which are arranged extending in the longitudinal direction of the vehicle. Each bogie beam is arranged along its respective side of the load unit, extending essentially parallel to two corresponding frame beams that, together with transverse beams, form the abovementioned rear frame. Moreover, each bogie beam is pivotably suspended in the respective frame beam via swivel joints which allow a pivoting movement about an imaginary axis extending essentially transversely to the longitudinal direction of the load unit.

The front end portion of each bogie beam rests against the respective end portion of the front bogie axle, while the rear end portion of each bogie beam rests against the respective end portion of the rear bogie axle. The bogie beams act against the bogie axles via intermediate relatively rigid rubber elements with spring action. These spring elements are typically firmly connected to both the bogie axle and the bogie beam concerned.

The purpose of the bogie arrangement described above is to provide a suitable distribution of the load concerned over each bogie axle. To this end, the bogie arrangement is constructed so as to allow a diagonal bogie movement, that is to say a state in which the bogie axles are positioned with a different degree of inclination (compared with the horizontal plane) in relation to one another. In this way, the load that is carried by the vehicle can also be distributed between the four wheels on the load unit. The bogie arrangement is also designed in order to provide suitable springing in the vertical direction and a suitable degree of rigidity in the swaying direction of the vehicle.

During use of a frame-steered dumper, for example during construction work, there is a general requirement to be capable of driving as quickly as possible with the dumper. This applies especially when the dumper is driven without load. In order for it to be possible to maintain a high speed with a load unit that is not loaded, it is then particularly when driving on uneven ground desirable to have soft springing in the vertical direction. This affords good comfort for the driver of the vehicle. Otherwise, at high speeds with an unloaded load unit and rigid springing in the vertical direction, a problem may arise on account of the load unit having a tendency to bounce and rock, which of course has a negative effect on driver comfort. By making the springing weak in the vertical direction, this problem can therefore be eliminated.

In a frame-steered dumper as described above and having weak springing, however, another problem is encountered when the vehicle is then driven with load. To be more precise; in the form of inadequate roll rigidity of the vehicle or too low of a degree of rigidity against swaying movements. This can be observed, for example, when driving on bends. Weak springing in the vertical direction in an unloaded vehicle therefore acts counter to the requirement with regard to high roll rigidity of a loaded vehicle.

On the other hand, it can be said that sufficient rigidity against rolling movements is obtained by making use of relatively rigid springing. But rigid springing then leads to poor comfort when the vehicle is unloaded. Moreover, more rigid springing results in an increase in the dynamic forces that act against the ground, which in turn increases the wear on the road.

The abovementioned problems also apply in connection with trucks and towed vehicles, where inadequate rigidity in the rolling or swaying direction can lead to the risk of accidents and excessive rigidity can result in road damage and wear.

The problem of combining weak springing with sufficient roll rigidity can be solved in wheel suspensions based on single axles by means of a stabilizer that normally consists of an essentially U-shaped strut that is arranged so that it connects both wheels on the same axle to the frame or chassis of the vehicle. The end portions of the strut are then suitably connected to the springing system of the vehicle, while the central portion of the strut is connected to the vehicle chassis. When, for example during cornering, the vehicle sways, the springing on the outer side of the vehicle is compressed whereas the springing on the inner side of the vehicle is extended. This means that the stabilizer is twisted about its longitudinal axis, the torsional rigidity of the stabilizer then defining the sway rigidity of the vehicle. By suitably matching the dimensions and the torsional rigidity of the stabilizer, the arrangement contributes to better road-holding of the vehicle.

In connection with a bogie arrangement in a frame-steered dumper of the type mentioned above, however, a conventional stabilizer will counteract the abovementioned diagonal bogie movement, which is a disadvantage. On road vehicles, this could be accepted, but it is a serious limitation for cross-country vehicles, because the resistance to the diagonal bogie movement can lead to reduced pressure of some wheels on the ground, which then tend to slip or skid.

One solution to the abovementioned problem is to use a hydraulic arrangement for wheel suspension. This can then be adapted to control the springing function in the vertical direction and the roll rigidity independently of one another by means of hydraulic devices. These devices can in turn be operated by means of a control unit depending on the current operating situation. A disadvantage of such a solution, however, is that it is very expensive.

SUMMARY OF INVENTION

An objective of the present invention is to provide an improved arrangement for wheel suspension in a vehicle such that the problem of combining weak springing for an unloaded vehicle with sufficient roll rigidity for a loaded vehicle is solved.

The invention may exemplarily take the form of an arrangement for wheel suspension in a vehicle having a vehicle frame that bears at least two bogie axles which in turn each bear a wheel axle. A first bogie element and a second bogie element are also included that extend essentially in the longitudinal direction of the vehicle and are suspended in the vehicle frame. The invention is characterized in that it has at least one connection element extending essentially transversely to the longitudinal direction of the vehicle, which connection element is connected movably to at least one of the bogie axles and also to the bogie elements for transmission of a force that arises when relative movement takes place between the bogie axle concerned and the bogie elements.

By virtue of the invention, an advantage is obtained in that it affords an effective solution to the problem of simultaneously providing good comfort and a high degree of roll rigidity. This is achieved at a significantly lower cost than a corresponding hydraulic solution.

By virtue of the invention, a function is provided, which works only in the event of rolling movements of the vehicle in question. In this way, independence is brought about between the rigidity in the vertical direction of the vehicle and the rigidity as far as rolling movements are concerned. Both of these parameters can then be optimized individually. By virtue of the function of the invention, the abovementioned diagonal movement of the bogie arrangement is not affected, which is an advantage compared with a conventional stabilizer.

The invention is particularly suitable for use in frame-steered dumpers, because this is a type of vehicle that is utilized in extreme environments in which very great demands are made for stability in the lateral direction during driving. The invention affords corresponding advantages in conventional road vehicles as well.

BRIEF DESCRIPTION OF DRAWINGS

The invention will be explained in greater detail below with reference to a preferred illustrative embodiment and the accompanying drawings, in which.

DETAILED DESCRIPTION

Figure 1:
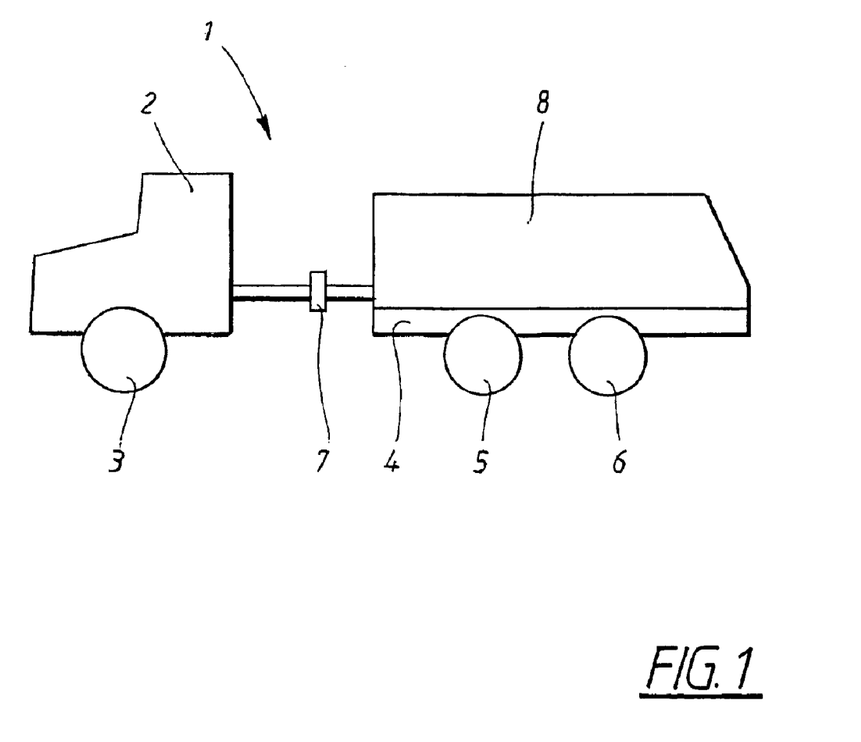
FIG. 1 shows diagrammatically a side view of a frame-steered dumper in which the present invention can be implemented.

FIG. 1 shows a greatly simplified side view of a frame-steered dumper 1, in which the present invention is intended to be used. The invention, however, is not limited to use in this type of vehicle, but can in principle be used in all types of vehicles where a requirement exists for a wheel suspension which provides driver comfort and a high degree of roll rigidity.

Figure 2:
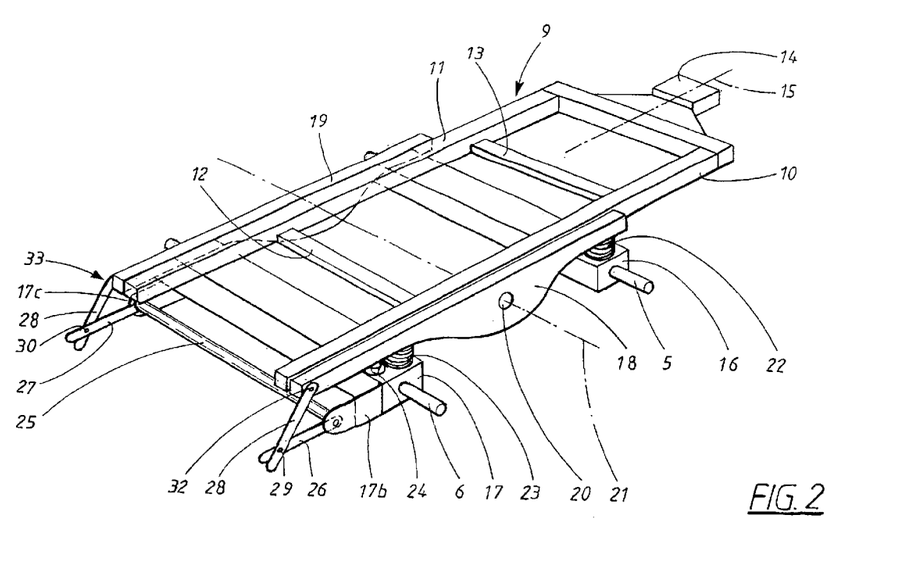
FIG. 2 is a perspective view that shows a load unit of a frame-steered dumper, illustrating the basic construction and function of the present invention.

The two wheel axles 5, 6 are arranged in a bogie arrangement which will now be described in detail with reference to FIG. 2 which is a simplified, diagrammatic perspective view of the load unit 4, seen at an angle from the rear. FIG. 2 shows only the components in the load unit 4 which are necessary for understanding the invention. For example, its load space is not shown, nor are any components forming part of the power transmission of the vehicle.

As can be seen in FIG. 2, the load unit is made up of a vehicle frame 9 which in turn includes two essentially parallel frame beams 10, 11 extending essentially in the longitudinal direction of the vehicle. The frame beams 10, 11 are connected to two transverse beams 12, 13. Furthermore, the front portion of the frame 9, that is to say the end portion facing the engine unit is provided with a coupling unit 14, by means of which the engine unit can be connected to the load unit. The coupling unit 14 also includes a special steering coupling that allows rotation of the engine unit and the load unit in relation to one another about an imaginary axis 15 extending in the longitudinal direction of the vehicle.

Together with two bogie axles, to be precise a front bogie axle 16 and a rear bogie axle 17, the frame 9 forms a bogie arrangement. The front bogie axle 16 bears the abovementioned front wheel axle 5 (cf. FIG. 1), while the rear bogie axle 17 bears the abovementioned rear wheel axle 6. Four wheels are in a customary manner mounted on the end portions of the wheel axles 5, 6 which project from each side of the frame 9.

In accordance with what is previously known, the frame 9 includes two bogie elements that, according to the exemplary embodiment, preferably have a first bogie beam 18 and, respectively, a second bogie beam 19. The bogie elements 18, 19 are each mounted pivotably in a swivel (only a first swivel 20 being visible in FIG. 2) and can thus, independently of one another, be pivoted about an imaginary axis 21 that runs through these two swivels. The bogie elements 18, 19 extend essentially parallel to the two frame beams 10, 11, that is to say in the longitudinal direction of the vehicle. In a normal state of the vehicle in which there is essentially no swaying movement of the vehicle and the bogie axles 16, 17 have essentially the same inclination, the front end portion of the first bogie beam 18 rests against the front bogie axle 16, while the rear end portion of the first bogie beam 18 rests against the rear bogie axle 17. To this end, use is made of an intermediate spring element, preferably in the form of a first rubber bearing 22, between the front end portion of the first bogie beam 18 and the front bogie axle 16. A further spring element, preferably in the form of a second rubber bearing 23, is also used between the rear end portion of the first bogie beam 18 and the rear bogie axle 17.

Spring elements of the same type described above are included as spring elements 22, 23 configured according to the invention. In this connection, the spring elements are adapted so that they are connected firmly to the bogie axle in question and the end portions of the bogie beams. In contrast to this, it is a basic principle underlying the present invention that the spring elements 22, 23 be connected firmly only to the respective bogie axle 16, 17. The spring elements 22, 23 therefore rest against the respective bogie axle 16, 17, but are freed from the bogie beams 18, 19; that is to say, they are not connected firmly to the end portion concerned of the bogie beams 18, 19. In accordance with the following detailed description, the spring elements 22, 23 are used only for damping in the event that the dumper is loaded.

In order for it also to be possible to provide balanced damping when the vehicle is unloaded, according to the invention use is made of a supplementary spring element 24 which is arranged between the rear end portions of each bogie beam 18, 19 and the respective end portion of the rear bogie axle 17. When the dumper is unloaded, the springing of the bogie beams 18, 19 is therefore not effected by the first-mentioned spring elements 22, 23, but instead by the supplementary spring element 24. This supplementary spring element 24 preferably consists of an air bellows, but can alternatively consist of a steel, rubber or hydraulic spring.

In a manner corresponding to that explained above, the front end portion of the second bogie beam 19 rests against the front bogie axle 16, while the rear end portion of the second bogie beam 19 rests against the rear bogie axle 17. Springing elements of the abovementioned type are also arranged between the front end portion of the second bogie beam 19 and the front bogie axle 16 and also between the rear end portion of the second bogie beam 19 and the rear bogie axle 17. However, these spring elements cannot be seen in FIG. 2.

By virtue of the fact that the bogie beams 18, 19 can be pivoted independently of one another about the imaginary axis 21, a diagonal movement of the complete bogie arrangement is permitted, which in turn leads to the two bogie axles 16, 17 being allowed to be positioned with different inclination in relation to one another, and moreover essentially independently of one another. This manner of functioning is especially advantageous when driving cross-country with the vehicle in question, and contributes to suitable distribution of the load concerned of the vehicle over the bogie axles 16, 17.

In accordance with what has been explained above, it is a problem associated with previously known wheel suspensions for frame-steered dumpers to combine the requirement for soft springing in the vertical direction with a high degree of rigidity as far as rolling movements, that is to say swaying movements, of the vehicle are concerned. To this end, it is a basic principle underlying the present invention that the two end portions of the rear bogie axle 17 are interconnected by means of a connection element in the form of a transverse shaft 25. This shaft 25 preferably consists of an essentially torsionally rigid torsion bar and runs essentially parallel to the rear bogie axle 17. The shaft 25 is also arranged so that its end portions are mounted rotatably in special fixing elements 17b, 17c that constitute integral parts of the respective end portion of the rear bogie axle 17. The transverse shaft 25 therefore extends essentially at right angles to the longitudinal direction of the vehicle, and is allowed to rotate freely in its mountings in the fixing elements 17b, 17c. This rotary movement is permitted while the rear bogie axle 17 is independently allowed to move in a sprung manner in the vertical direction.

The arrangement according to the invention also includes a first lever 26, one end portion of which is fixed non-rotatably to one end portion of the transverse shaft 25, and a second lever 27, one end portion of which is fixed non-rotatably to the opposite end portion of the transverse shaft 25. That end portion of the first lever 26 that is not fixed to the transverse shaft 25 is in turn fixed to a first link element 28, via a swivel 29. In a corresponding manner, that end portion of the second lever 27 that is not fixed to the transverse shaft 25 is fixed to a second link element 30, via a further swivel 31. The opposite end portions of the link elements 28, 30 are furthermore fixed rotatably to the rear portions of the respective bogie beam 18, 19, via further swivels 32, 33 (one swivel 33 of which is somewhat concealed in FIG. 2).

Figure 3:
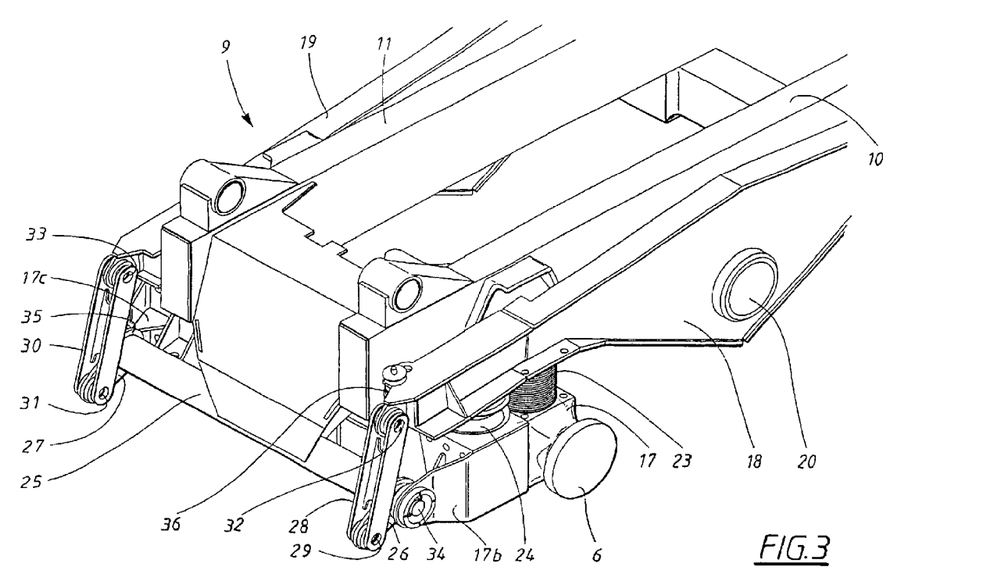
FIG. 3 is a perspective view that shows in detail a rear section of the load unit, illustrating the construction of the invention.
Figure 4:
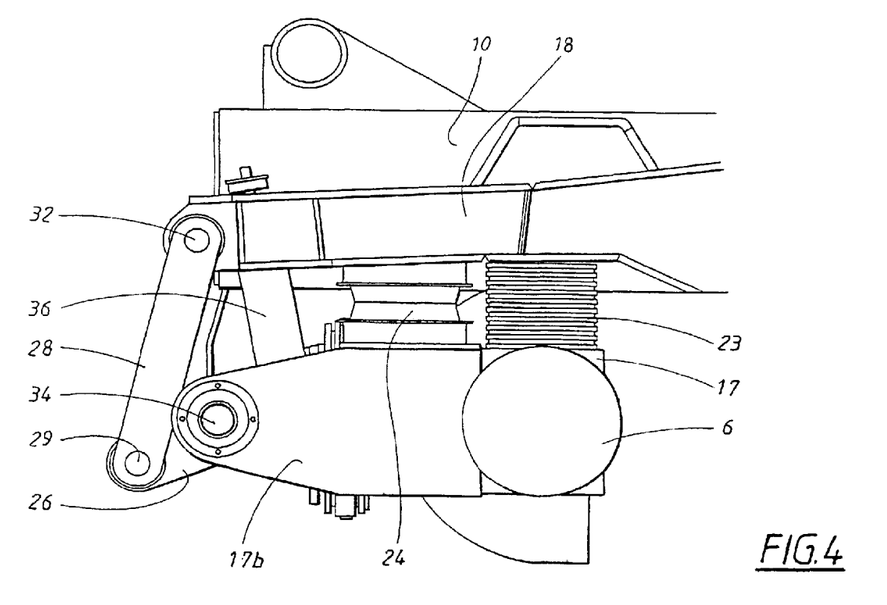
FIG. 4 is a side view that shows the arrangement according to FIG. 3, the frame-steered dumper being in a loaded state.

FIG. 3 shows a slightly enlarged perspective view of the rear part of the frame 9 of the load unit, which shows the invention according to a preferred embodiment in greater detail. Furthermore, FIG. 4 shows a side view of the arrangement according to FIG. 3. The components that appear in FIGS. 3 and 4 and have been referred to above have the same reference numbers as above. As can be seen in FIG. 3 in particular, the transverse shaft 25 is mounted rotatably in each end portion of the rear bogie axle 17. To this end, each end portion of the rear bogie axle 17 is designed with a respective fixing element 17b, 17c which projects a certain distance backwards, in relation to the direction of travel of the vehicle. The fixing elements 17b, 17c therefore define two swivels 34, 35 which themselves allow rotation of the transverse shaft 25 in relation to (and parallel to) the rear bogie axle 17. Furthermore, the two abovementioned levers 26, 27 are arranged symmetrically on either side of the vehicle. One end portion of each lever 26, 27 is connected rotationally rigidly to the transverse shaft 25, while the other end portion of each lever 26, 27 is connected rotatably to the respective link element 28, 30. The link elements 28, 30 suitably consist of elongate metal links that are in turn fixed rotatably to the respective end portion of the two bogie beams 18, 19, via the abovementioned swivels 32, 33.

As can also be seen in FIGS. 3 and 4, the frame 9 includes a springing arrangement which itself includes two spring elements 23, 24 which damp any forces that act between the bogie beams 18, 19 and the rear bogie axle 17. It may be noted that FIG. 4 shows the arrangement according to the invention in a state in which the vehicle is loaded. A shock absorber 36 is also arranged between the rear portion of the first bogie beam 18 and the rear bogie axle 17. In a corresponding manner, another shock absorber (cannot be seen in the figures) is arranged between the rear portion of the second bogie beam 19 and the rear bogie axle 17. These shock absorbers are used so as, together with the abovementioned spring elements 23, 24, to provide an optimally balanced springing and damping function for the vehicle. In this connection, the shock absorber 36 is adapted to the spring constant of the various spring elements 23, 24.

During driving with the vehicle in question, swaying movements of the frame 9 may occur when, for example, driving on bends. This corresponds to one bogie beam 18 being pressed down while the other bogie beam 19 is raised. If, for example, the first bogie beam 18 is pressed down in relation to the second bogie beam 19, the transverse shaft 25 will by virtue of the action of the first link element 28 and the first lever 26 be rotated in its mounting in the two fixing elements 17b, 17c. As the transverse shaft 25 is fixed non-rotatably to the second lever 27, the latter will (via the second link element 30) also act on the second bogie beam 19 in the downward direction. By virtue of this force transmission between the two bogie beams 18, 19, the swaying movement can be damped. On the other hand, any movement in the vertical direction of the frame 9 will not involve any such force action between the two bogie beams 18, 19. Instead, the degree of springing in the vertical direction of the frame 9 is selected entirely independently of the degree of torsional rigidity. It may be mentioned, for example, that the spring element 23 can be matched for suitable damping of the force with which the first bogie beam 18 acts on the rear bogie axle 17. Moreover, the shock absorber 36 can be optimized to this end, as explained above. By virtue of suitable matching of the supplementary spring element 24 as well, the springing can be optimized in the vertical direction for the best comfort in both the loaded and unloaded state, and also for minimum effect on the roadway, while the roll rigidity can also be optimized by matching the transverse shaft 25 and its link arrangement.

Figure 5:
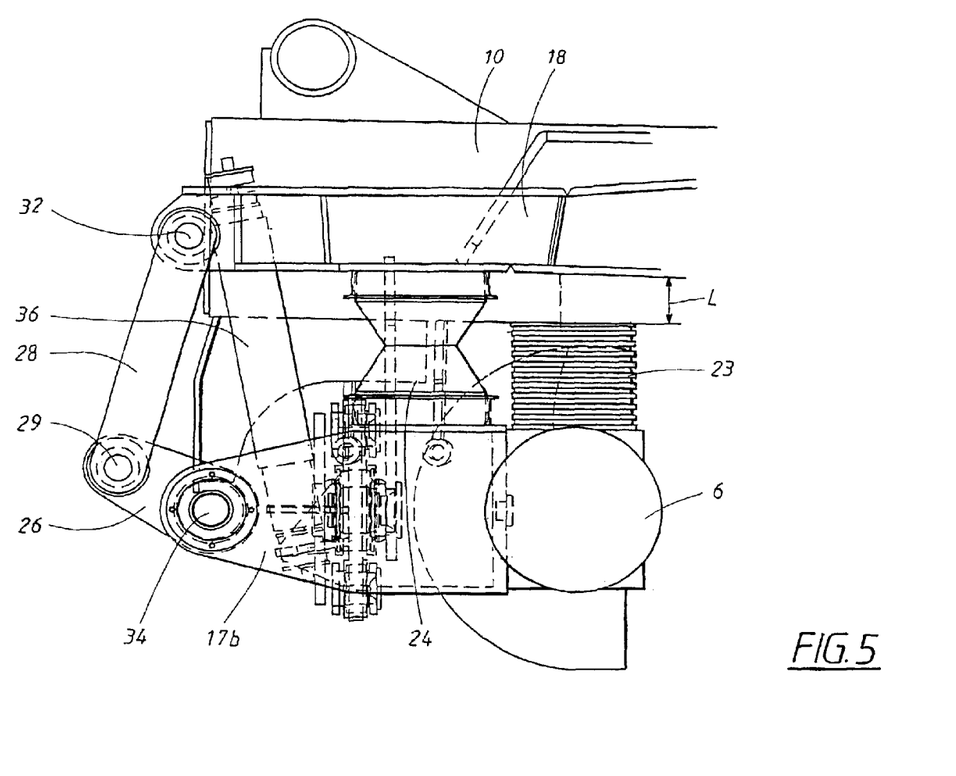
FIG. 5 is a side view corresponding to FIG. 4, but showing the invention in a state in which the frame-steered dumper is unloaded.

FIG. 3 shows the invention in a state in which the bogie beams 18, 19 are pressed a relatively long way down, which can be the to correspond to, for example, an operating state in which the vehicle is loaded. In a corresponding manner, this state can be seen in FIG. 4, which also shows a situation in which the vehicle is loaded. It can be seen from FIG. 4, for example, that the bogie beam 18 bears against the spring element 23. In this state, use is made of in particular the spring element 23 for springing the first bogie beam 18 in relation to the rear bogie axle 17. In contrast to this state, FIG. 5 shows a side view of the arrangement described above, where the vehicle is in an unloaded state, that is to say where the bogie beams are raised in relation to the frame as a whole. It is a basic principle of the invention that the spring element 23 is in this latter state freed from its contact with the underside of the first bogie beam 18, so that a free spring excursion (when the machine is unloaded) with a predetermined distance L is defined between the spring element 23 and the first bogie beam 18, as indicated in FIG. 5. In this state, use is also made of the supplementary spring element 24 for springing the movement of the bogie beam 18. It can therefore be seen that the various spring elements 23, 24 can be used for optimum springing in both the loaded and the unloaded state. The springing functions in these respective states can then be designed independently of one another.

The spring element 23 is therefore not used at all when the vehicle is unloaded. Use is then instead made of the supplementary spring element 24 for suitably balanced vertical springing. At the same time, use is made of the stabilizing function of the transverse shaft 25 (cf. FIG. 3) as explained above.

Figure 6:
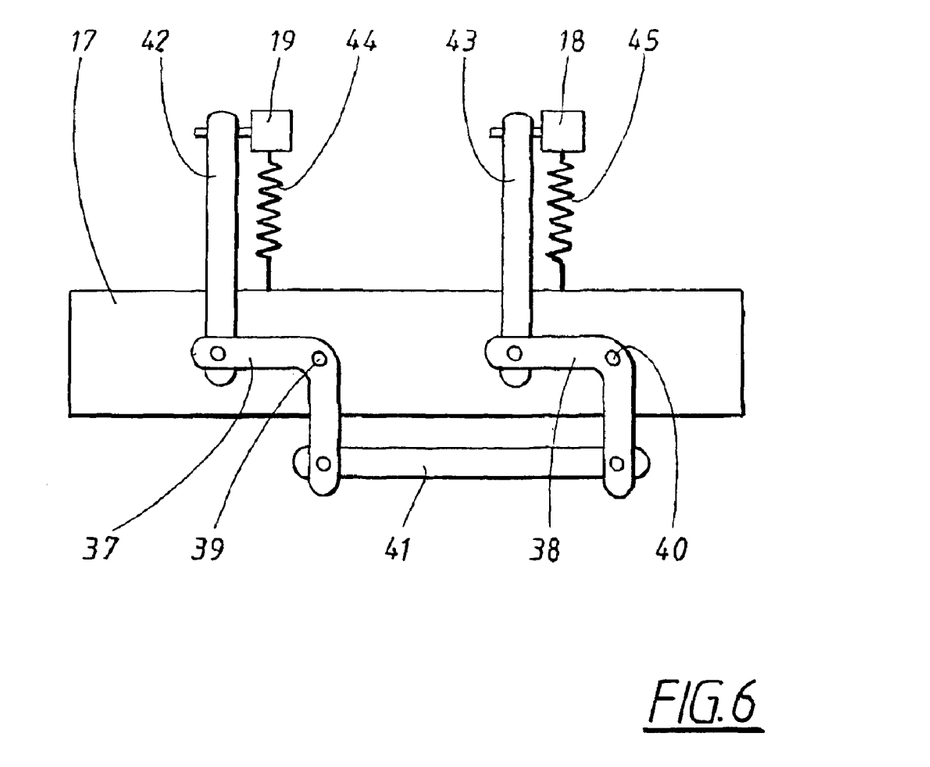
FIG. 6 is a simplified diagrammatic sketch of an alternative embodiment of the invention.

FIG. 6 shows a simplified view from the rear of a vehicle frame 9', according to an alternative embodiment of the invention. As can be seen from FIG. 6, the abovementioned rear bogie axle 17 bears two levers 37, 38 which are mounted pivotably about two corresponding pivots 39, 40 arranged in the rear bogie axle 17. The one-end portions of the levers 37, 38 are interconnected via a transverse strut 41, that is to say an elongate link element that runs essentially transversely to the longitudinal direction of the vehicle. The other end portions of the levers 37, 38 are connected to two link elements 42, 43 which are in turn connected to the end portions of the second bogie beam 19 and, respectively, the first bogie beam 18. The arrangement, according to FIG. 6, also includes a springing arrangement comprising two shock absorbers 44, 45 or equivalent components.

In the event of a swaying movement of the vehicle, when, for example, the first bogie beam 18 is pressed downwards in relation to the second bogie beam 19, the corresponding lever 38 will be caused to pivot about its swivel 40. This in turn means that the transverse strut 41 causes the second lever 37 to rotate about its swivel 39. This results in the lever 37, via the link element 42, acting on the second bogie beam 19 in a downward direction. In this embodiment as well, a force transmission therefore takes place between the bogie beams 18, 19 in order to reduce the swaying forces. At the same time, it may be observed that the springing in the vertical direction of the arrangement can be optimized by way or means of the design of the shock absorbers 44, 45 that then work independently of the displacement of the transverse strut 41 in the lateral direction.

The invention is not limited to the illustrative embodiments described above and shown in the drawings, but can be varied within the scope of the claims below. For example, the invention can be used in various types of vehicle in which there is a requirement relating to good comfort and great roll rigidity. The invention is therefore not limited to cross-country vehicles such as frame-steered dumpers. The invention can therefore be used in both trucks and towed vehicles.

The invention can also be used in both driving and trailing bogie axles. The arrangement according to the invention can moreover be arranged at the rear or front bogie axle, or at both. In principle, the invention can also be used on a bogie arrangement that includes, for example, three bogie axles. Furthermore, more than one connection element per bogie axle can in principle be used.

According to an alternative solution, the transverse shaft is mounted in each bogie beam, links then being used in order to connect it to a bogie axle.

In principle, the bogie arrangement described above can be replaced by another springing system with an essentially corresponding bogie function, for example where two plate springs are used as bogie elements instead of the abovementioned bogie beams with associated spring elements. By designing the bogie elements in the form of a plate spring assembly, the springing function concerned is also obtained when the vehicle is loaded, that is to say with the air spring 24 (see, for example, FIG. 4) completely compressed.

What is claimed is:

1. An arrangement for wheel suspension in a vehicle, said arrangement comprising:

a vehicle frame bearing at least two bogie axles which in turn each bear a wheel axle;

a first bogie element and a second bogie element, each extending essentially in a longitudinal direction of the vehicle and being pivotally connected to said vehicle frame; and a connection element extending essentially transversely to the longitudinal direction of the vehicle, said connection element being interconnected to at least one of said bogie axles and to said bogie elements for transmission of a force which arises when relative movement takes place between the concerned bogie axle and said bogie elements.

2. The arrangement as recited in claim 1, wherein said connection element consists of a rigid bar which is anchored by rotatable connection to one bogie axle.

3. The arrangement as recited in claim 1 wherein said connection element is rotatably connected with each of two end portions of said bogie axle and is interconnected to each bogie element, via link and lever elements.

4. The arrangement as recited in claim 3, wherein each end portion of said connection element is non-rotatably connected to a first lever and a second lever, and each of the levers being connected to a respective bogie element via a link element.

5. The arrangement as recited in claim 4, wherein said first and second levers are positioned along said connection element symmetrically in relation to a longitudinal axis of symmetry of the vehicle.

6. The arrangement as recited in claim 1, further comprising spring elements positioned between said bogie elements and respective bogie axles for springing essentially vertical movements of said bogie elements when the vehicle is loaded.

7. The arrangement as recited in claim 6, wherein said spring elements define a free spring gap space between said bogie elements and respective bogie axles when the vehicle is unloaded.

8. The arrangement as recited in claim 7, further comprising a second spring element that independently springs essentially vertical movement between said bogie elements and respective bogie axles.

9. The arrangement as recited in claim 1, said connection element consists of an elongate element, the end portions of which are pivotally connected to two levers which are each anchored by a rotatable connection to one bogie axle, each lever being fixed to the respective bogie element.

10. The arrangement as recited in claim 9, wherein said connection element is displaced essentially parallel to said bogie axle when said force transmission takes place, said levers being caused to pivot in the same direction of rotation.

11. The arrangement as recited in claim 1, wherein said first bogie element and said second bogie element consist of a first bogie beam and, respectively, a second bogie beam which are pivotably suspended from said vehicle frame about a swivel extending essentially parallel to and between said bogie axles.

12. The arrangement as recited in claim 1, wherein said bogie elements consist of a plate spring.

13. A load-force transfer arrangement for a wheel suspension in a vehicle for counteracting vehicle roll tendencies on uneven terrain and vehicle sway tendencies in turns, said arrangement comprising:

first and second bogie elements spaced apart from one another and each pivotally connected to a vehicle frame at substantially opposite lateral positions relative to said vehicle frame, each of said bogie elements extending essentially parallel to a longitudinal direction of the vehicle;

a bogie axle assembly, including an elongate force transfer shaft, interconnected by a pair of two linkages to the first and second bogie elements;

one of the pair of linkages located at one of two substantially opposite ends of said bogie axle assembly and the other of the pair of linkages located at the opposite end of the bogie axle assembly, said elongate force transfer shaft rotatably connected to said bogie axle assembly at each of two ends of said shaft;

each of said linkages comprising a link having two opposite ends and a lever having two opposite ends, said link and said lever being pivotally interconnected at an end of each, and said lever being fixed to the force transfer shaft at the opposite end thereof from the interconnection to the link and said link being pivotally connected to a respective and corresponding one of the bogie elements at the opposite end thereof from the interconnection to the lever; and said pair of linkages and said force transfer shaft being configured with said bogie elements and said bogie axle assembly so that unequal displacement between respective ends of the bogie axle assembly and the corresponding bogie element induces a biasing force urging the opposite end of the bogie axle assembly to equal displacement with respect to that end's corresponding bogie element.

14. The arrangement as recited in claim 13, further comprising:

said bogie axle assembly having a bogie axle bearing a wheel axle; and said elongate force transfer shaft forming a connection element extending essentially transversely to the longitudinal direction of the vehicle.

15. A force transfer arrangement for a wheel suspension in a vehicle for counteracting vehicle roll tendencies on uneven terrain and vehicle sway tendencies in turns, said arrangement comprising:

first and second bogie elements spaced apart from one another and each pivotally connected to a vehicle frame at substantially opposite lateral positions relative to said vehicle frame, each of said bogie elements extending essentially parallel to a longitudinal direction of the vehicle;

a bogie axle assembly, including an elongate force transfer shaft, interconnected by a pair of two linkages to the first and second bogie elements;

one of the pair of linkages located at one of two substantially opposite ends of said bogie axle assembly and the other of the pair of linkages located at the opposite end of the bogie axle assembly, said elongate force transfer shaft rotatably connected to said bogie axle assembly at each of two ends of said shaft; and each of said linkages comprising a link having two opposite ends and a lever having two opposite ends, said link and said lever being pivotally interconnected at an end of each, and said lever being fixed to the force transfer shaft at the opposite end thereof from the interconnection to the link and said link being pivotally connected to a corresponding and respective one of the bogie elements at the opposite end thereof from the interconnection to the lever; and wherein the interconnection of said pair of linkages, said force transfer shaft, said bogie elements and said bogie axle assembly constitute a vehicle suspension assembly having stabilization means for transferring forces within the suspension assembly so that unequal displacement between respective ends of the bogie axle assembly and the corresponding bogie elements induces a biasing force urging the opposite ends of the bogie axle assembly toward equal displacement with the corresponding and respective bogie element.

16. The arrangement as recited in claim 15, further comprising:

said bogie axle assembly having a bogie axle bearing a wheel axle; and said elongate force transfer shaft forming a connection element extending essentially transversely to the longitudinal direction of the vehicle.

* * * * *